July 21, 1959     I. WEINGLAS     2,895,350
CUTTING DEVICE FOR TEETH OF SAWS, FILES AND THE LIKE
Filed May 20, 1957     3 Sheets-Sheet 1
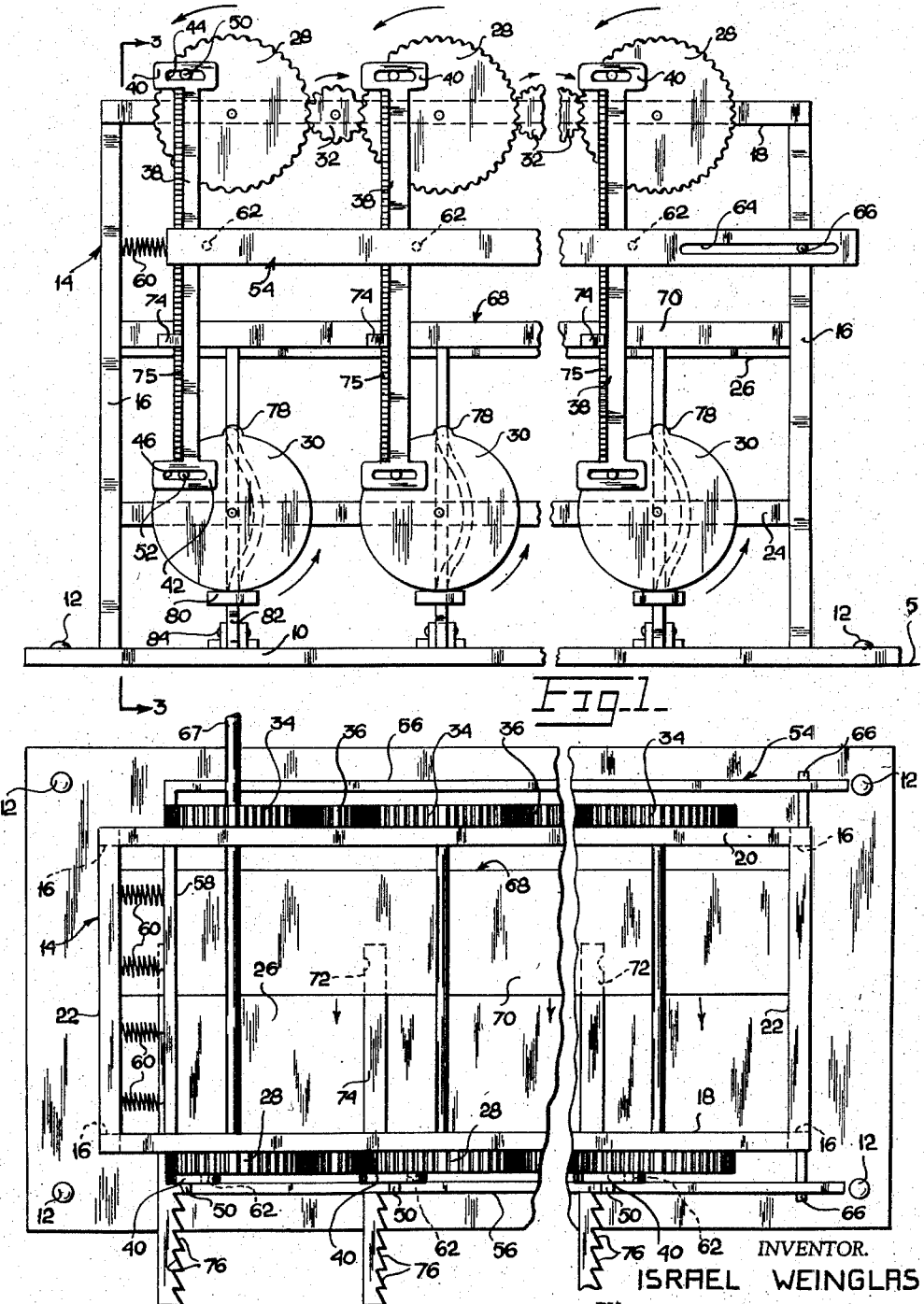
INVENTOR.
ISRAEL WEINGLAS

INVENTOR.
ISRAEL WEINGLAS
BY
ATTORNEY

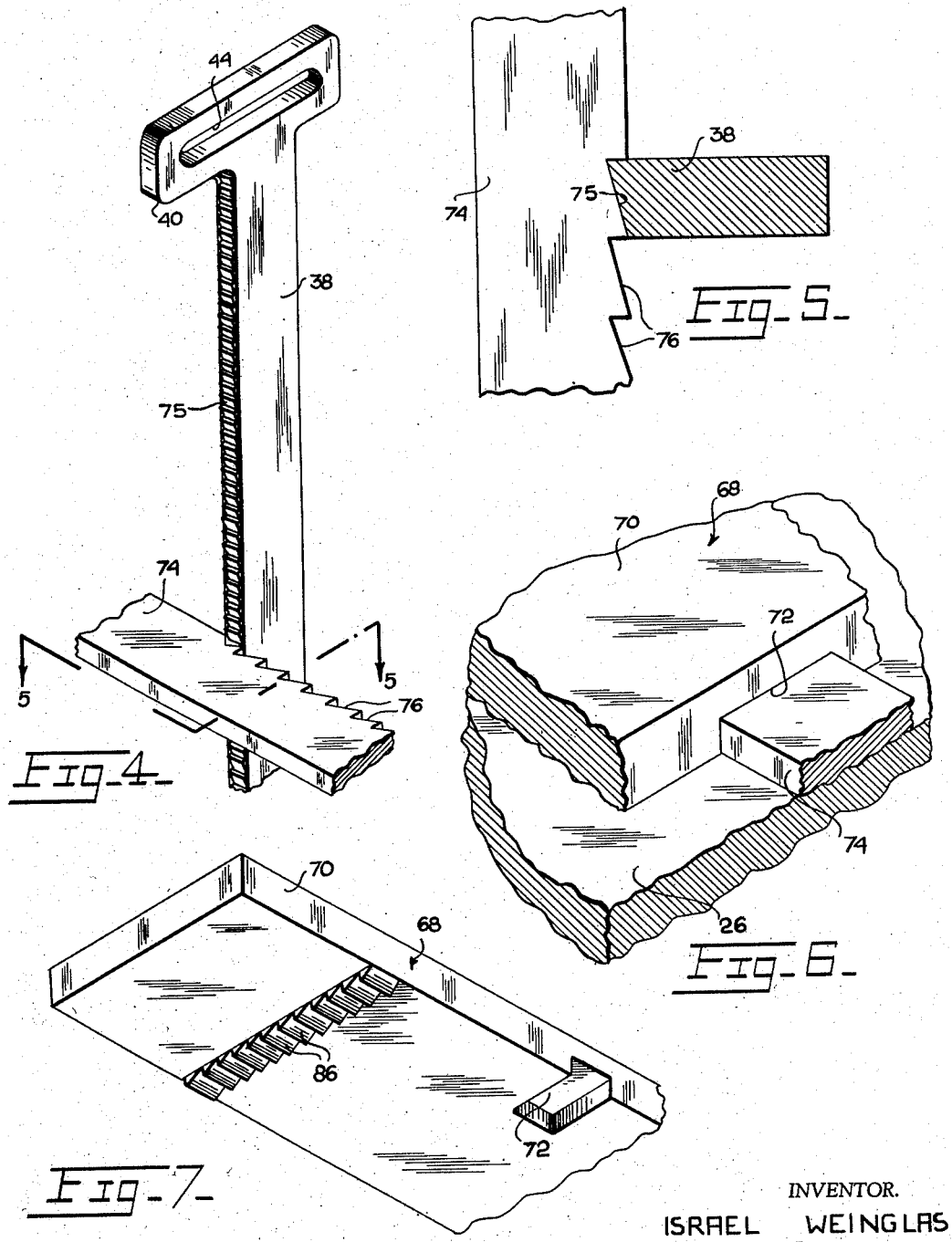

United States Patent Office 2,895,350
Patented July 21, 1959

2,895,350

CUTTING DEVICE FOR TEETH OF SAWS, FILES AND THE LIKE

Israel Weinglas, New York, N.Y.

Application May 20, 1957, Serial No. 660,367

10 Claims. (Cl. 76—31)

This invention relates to apparatus for making or cutting file teeth in file or saw blades and, more particularly, has reference to a device having a series of light, conjointly reciprocating cutting blades adapted to form a series of teeth in saws.

The making of saws, at present, is a rather time-consuming, laborious, and expensive process. Saws are in general made singly or in comparatively small quantities and this, of course, is undesirable in view of the fact that the saws cannot be produced at a sufficiently low cost to justify large scale commercial production and use thereof.

The main object of the present invention, in view of the above, is to provide a device for making saws, which device will be so designed as to permit the mass production of saws of the type referred to, despite the fact that said saws must be made with complete accuracy, and must have relatively fine, small cutting teeth.

Another object is to provide a device of the character stated which will permit the manufacture of a large number of saws, all identical to each other, so that said saws may be used interchangeably.

A further object is to insure that the device will permit all of the saws to be simultaneously filed, so far as each tooth thereof is concerned, that is, the device is so designed as to cause a plurality of cutting blades to first cut by filing one tooth of a plurality of saws, then a second tooth, then a third tooth, etc., with corresponding teeth of the several saws being cut at the same time.

Another object is to insure a step-by-step advancement of the saws, following the cutting of each tooth, so as to properly locate the same, ready for cutting of the next tooth.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a side elevational view of a device for making file teeth in saws, formed according to the present invention, a portion being broken away.

Fig. 2 is a top plan view, a portion being broken away.

Fig. 4 is a fragmentary perspective view, the scale being still further enlarged.

Fig. 5 is a sectional view, still further enlarged, on line 5—5 of Fig. 4.

Fig. 6 is a fragmentary perspective view on the scale of Fig. 5, of the saw blade and its support.

Fig. 7 is a fragmentary perspective view of the blade support seen from below.

Figure 3:
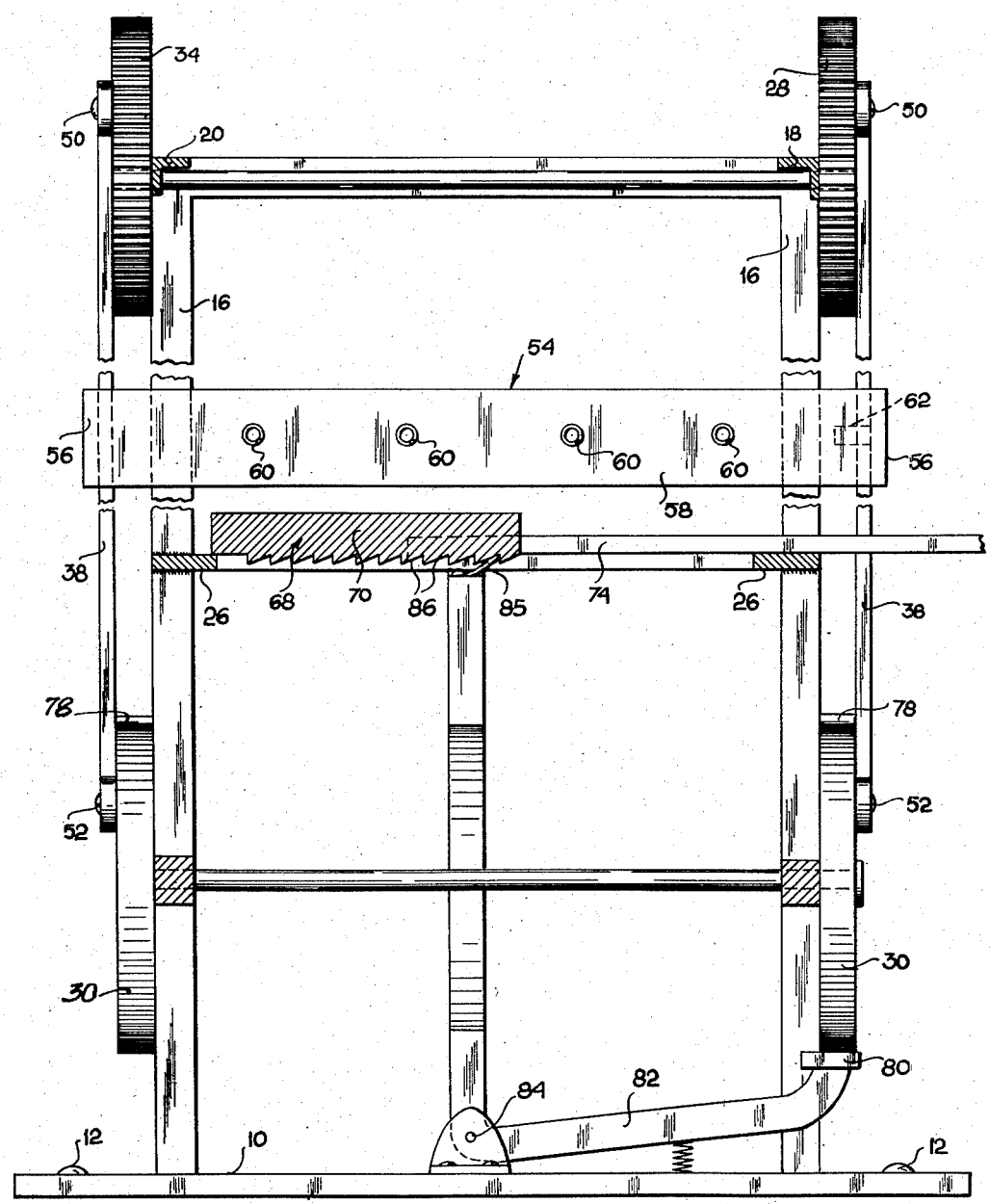
Fig. 3 is an enlarged transverse sectional view substantially on line 3—3 of Fig. 1.

Referring to the drawings in detail, the apparatus includes a flat, rectangular base 10 which may be bolted at 12 to a suitable supporting surface 5. A frame generally designated 14 is fixedly mounted upon and extends upwardly from base 10. The frame includes rectangularly spaced, vertical corner posts 16 rigid at their upper ends with a pair of longitudinal frame members 18, 20, said longitudinal frame members constituting front and back members respectively. Fixedly connected between the corner posts, at opposite ends of the members 18, 20, are side frame members 22. Members 18, 20, 22 are disposed in a common horizontal plane. Lower longitudinal frame members 24 are also welded or otherwise fixedly connected to and between the corner posts, extending horizontally in parallel, vertically spaced relation to the front and back members 18, 20. Further reinforcement of the frame is provided by intermediate, horizontally extending longitudinal frame members 26, also connected between the corner posts, and extending along the front and back, respectively, of the frame.

Rotatably mounted upon the member 18 are uniformly spaced gears 28, these being provided at the front of the machine and being aligned vertically with wheels 30 rotatably supported upon the lower front frame member 24. The several gears 28 turn in the same direction as shown by the arrows in Fig. 1, said wheels turning counterclockwise in this figure of the drawing. The several gears are in mesh with pinions 32 which rotate oppositely to the gears 28 as shown in Fig. 1, each pinion being in mesh with the gears 28 at opposite sides of the pinion. Although only three gears 28 are shown in Fig. 1, it will be understood that the greatest portion of the apparatus is broken away, and in a typical commercial embodiment, there might be as many as twenty or thirty gears 28, so as to permit the simultaneous cutting of an equal number of jewelers' saws.

At the back of the apparatus, there are rotatably mounted, upon the upper back frame member 20, gears 34 (Fig. 2) matching in size and location the several gears 28. Pinions 36, transversely aligned with and corresponding to the several pinions 32, are in mesh with the several gears 34. The purpose of the gears 34 is to provide for a balanced driving action at the front and rear of the apparatus, and to this end, there are provided, at the back of the apparatus, lower wheels corresponding to the several wheels 30 shown in Fig. 1 at the front of the apparatus.

Thus, it will be seen that at the front and rear of the frame, there are pairs of gears and wheels, each pair comprising a gear 28 and a wheel 30 at the front of the apparatus, and a corresponding upper gear 34 and lower wheel at the rear of the apparatus.

The gear and wheel of each pair are connected for conjoint rotational movement through the medium of elongated, straight connecting bars 38. The bars 38 at their upper and lower ends have crossheads 40, 42, respectively, formed with slots 44, 46, respectively, that are extended transversely of the lengths of the connecting bars 38. Engaged in the slots are pins 50, 52 of the gears 28 and wheels 30, respectively, said pins traveling about the axis of rotation of the several gears and wheels.

It will thus be seen that assuming that the several gears 28 are under positive drive from a suitable source of power, the wheels 30 will be rotated conjointly therewith, through the medium of the connecting bars. The connecting bars thus have an up-and-down motion. The connecting bars are also free to move laterally, through the provision of the slots 46, 44 at the lower and upper ends thereof.

In this connection, the several connecting bars of the apparatus are all under continuous, yielding pressure tending to pull the connecting bars 38 laterally to the left in Fig. 1. To this end, there is provided a U-shaped frame generally designated 54. Frame 54 includes side members 56 (Fig. 2) said side members being fixedly connected at one end by a bight 58. Connected between the bight 58 and the adjacent end of the frame 14 are contractile springs 60. These tend to pull the frame 54 horizontally, to the left in Figs. 1 and 2.

Projecting laterally inwardly from the respective side members 56 of the frame 54 are pins 62. These bear against the connecting bars 38, tending to shift the connecting bars 38 to the left in Fig. 1 under the pull of the springs 60.

Guiding the frame 54 in its horizontal movement are longitudinal slots 64 formed in the respective side frame members 56, and receiving guide pins 66 projecting laterally outwardly from the adjacent corner posts 16.

To drive the several gears, there is provided a drive shaft 67 which extends from a suitable source of power, such as a motor, not shown. Shaft 67 is being continuously rotated at a selected speed. Shaft 67, when rotated, causes the simultaneous rotation of all the gears 28, 32, 34 and 36 and wheels 30, and causes the connecting bars 38 to be moved upwardly and downwardly.

The pins 50 of gears 28 thus are at all times moving either upwardly or downwardly. This is true even when they are passing directly under the centers about which the gears 28 turn, because the pins 50 are traveling in perfectly circular paths. Therefore they are necessarily moving either upwardly or downwardly at all times.

Further, on starting of the machine, simultaneous rotation of the several gears 28 and, through the medium of the connecting bars 38 the wheels 30 will develop sufficient momentum in all the gears and wheels to cause them to attempt to move across any areas in which they might otherwise tend to lock. The rotational speed, in other words, would obviously be such that they would move the bars 38 across dead centers before they could create any tendency to lock.

Slidably supported upon the intermediate frame members 26 is a saw support frame generally designated 68. Frame 68 includes a wide, flat bar 70 supported slidably upon the plate 26, and extending from side to side of the machine, as shown in Fig. 2. The flat support bar 70 is adapted to be shifted in the direction of the arrows in Fig. 2, that is, toward the front of the machine, making a step-by-step advance. The bar 70 moves a single step forwardly, only a fraction of an inch, on each revolution of the wheels 30, but does not make said forward movement for approximately half the rotational cycle of the wheel 30, for a purpose to be made presently apparent.

Formed in the leading edge of bar 70 are forwardly opening, deep recesses 72, adapted to receive the rear ends of saws or saw blades 74, in which teeth 76 are to be formed by means of the apparatus.

Referring to Fig. 1, it will be seen that the connecting bars 38 are adapted to engage that edge of the respective saws 74 in which the teeth 76 are to be formed. The filing edges 75 of the connector bars that so engage and file the saws, this being the lefthand edge of each connector bar viewing the same as in Fig. 1, are of hardened, tempered cutting steel, so as to cause a saw tooth notch to be cut by the connecting bar each time the connecting bar is traveling downwardly from its Fig. 1 position, to a lower position angularly spaced 90° from that in which the connecting bars are shown in Fig. 1. The dimensions of the gears 28 and wheels 30 and the hardness of the bar blade 38 are such as to produce a stroke of the necessary length to result in such a notch.

In other words, as the gears and wheels rotate, the connecting bar cutting edges 75 are brought into engagement with the edge of the saw. As a result, the connecting bars cannot move further to the left in Fig. 1, as they begin their downward travel beyond their Fig. 1 positions. The slots 44, 46 permit the connecting bars to travel downwardly while still not moving any further to the left in Fig. 1 than the positions in which they are shown in this figure.

At this time, the pins 62 are exerting a continuous, yielding pressure against the longitudinal edges of the connector bar shown at the right in Fig. 1, tending to shift the connector bars to the left in Fig. 1. This causes the bars 38 to be held in firm engagement with the saws 74, during the downward movement of the connector bars made for the purpose of cutting a single notch in the saw.

As soon as the gears and wheels 28, 30, respectively, rotate to a position in which the pins 50, 52 are in what might be termed a "7 o'clock" position on gears 28 and wheels 30, at the right-hand ends of slots 44, 46, the bars 38 will move to the right in Fig. 1 out of engagement with the saws, so as to bodily shift the entire frame 54 to the right in Figs. 1 and 2, against the restraint of the springs 60. The bars 38 will now be completely out of engagement with the saws 74, after having cut one notch in the saws during the downward travel of the bars.

While the bars 38 are out of engagement with saws 74, and are moving upwardly at the right of the axis of rotation of the gears 28 and wheels 30, viewing the same as in Fig. 1, means for effecting step-by-step advancement of the saws 74 goes into action to advance the saws one step, to locate a new portion of the edge of each of the saws in position to be notched, during the next downward travel of the bars 38.

The means for effecting step-by-step advancement of the saws 74 includes cam projections or humps on the peripheries of the wheels 30, designated at 78. A single projection 78 is provided on each wheel 30, and said projection slightly trails the pins 52 in the sense of direction of rotation of the wheels 30, as clearly shown in Fig. 1.

Slidably contacting the wheels 30, at the lowermost portions of the wheels 30, are horizontal, flat heads 80 of approximately L-shaped levers 82 that are pivoted at 84 upon the base plate 10 for swinging movement in vertical planes perpendicular to the planes of rotation of the wheels 30. The levers 82, at the ends thereof opposite the heads, extend through openings formed in the plate 26, and within said openings, leaf spring pawls 85 are secured at one end to the levers 82, projecting forwardly from the levers to engage in ratchet notches 86 formed at the underside of the wide bar 70. The bar 70 can, of course, be increased in width so as to provide for the maximum extent of travel of the bar 70, thereby to correspondingly increase the length of the series of teeth 76 in the jewelers' saws. For the purposes of the present invention, of course, it is mainly essential to show the manner in which step-by-step advancement of the saw support means 70 can be effected, in synchronized, timed relation to the cutting means 38 that files the teeth in the saw blades.

The illustrated arrangement is merely illustrative of one of many that might possibly be employed, without departure from the spirit of the invention, so long as the modifications used remain within the scope of the appended claims. In the illustrated example, one means for simultaneously and identically filling the teeth of a large number of saws, automatically, is shown, this means including simultaneously reciprocating cutting blades 38, engaging the saws during the down stroke of the cutting blades, with said cutting blades being clear of the saws during their upstroke, the invention further including means for step-by-step advancement of the saws to expose new surfaces for cutting by the blades 38, the last-named means operating only when the cutting blades are in their upstroke, in spaced relation to and out of contact with the saws. This basic coactive relationship of the parts has the desirable effect of permitting the simultaneous cutting, a high degree of accuracy, of exceedingly small file teeth in a large number of saws, through the use of reciprocating cutters in a multiple arrangement of said cutters. A highly effective, automatically operating apparatus is thus provided which needs no attention other than to remove the saws after the teeth have been cut therein, for return of the several parts to their initial position, with new saws being placed in the recesses 72 to be acted upon by the cutting blades 38.

In this connection, it will be understood that a suitable stop motion, not shown, could be incorporated in the apparatus, such that when the saws 74 have advanced forwardly from the machine a maximum distance, with all the teeth being cut in the saws, a trip is actuated to halt the driving mechanism. Such trip may further actuate a signal to call the attention of the worker, for reloading the machine with saw blade stock and for returning the components to their start position.

While I have illustrated and described the preferred embodiment of my invention, it is to be understood that I do not limit myself to the precise construction herein disclosed and that various changes and modifications may be made within the scope of the invention as defined in the appended claims.

Having thus described my invention, what I claim as new, and desire to secure by United States Letters Patent is:

1. A reciprocating multiple-type apparatus for forming a series of notches in a plurality of saw blades, comprising a frame, means movably mounted therein for supporting a plurality of saw blades to be notched, reciprocating cutters on the frame arranged each adjacent a blade to be notched, so as to form notches in the blades responsive to reciprocation of the cutters, means on the frame supporting the cutters for movement against the blades on shifting of the cutters in one direction and for movement of the cutters away from the blades when the cutters are shifted in an opposite direction, and means on the frame for effecting step-by-step advancement of the blades past the cutters, the saw blade support means being slidably supported on the frame, for movement in a plane normal to the path of reciprocating movement of the cutters, said saw blade support means comprising a flat bar having recesses in which the saw blades may be removably engaged.

2. A reciprocating, multiple-type apparatus for forming a series of notches in a plurality of saw blades, comprising a frame, means movably mounted therein for supporting a plurality of saw blades to be notched, reciprocating cutters on the frame arranged each adjacent a blade to be notched, so as to form notches in the blades responsive to reciprocation of the cutters, means on the frame supporting the cutters for movement against the blades on shifting of the cutters in one direction and for movement of the cutters away from the blades when the cutters are shifted in an opposite direction, and means on the frame for effecting step-by-step advancement of the blades past the cutters, the saw blade support means being slidably supported on the frame, for movement in a plane normal to the path of reciprocating movement of the cutters, said saw blade support means comprising a flat bar having recesses in which the saw blades may be removably engaged, the cutter-supporting means comprising a pair of vertically spaced discs for each cutter, the cutter being connected between the discs of the pair.

3. A reciprocating, multiple-type apparatus for forming a series of notches in a plurality of saw blades, comprising a frame, means movably mounted therein for supporting a plurality of saw blades to be notched, reciprocating cutters on the frame arranged each adjacent a blade to be notched, so as to form notches in the blades responsive to reciprocation of the cutters, means on the frame supporting the cutters for movement against the blades on shifting of the cutters in one direction and for movement of the cutters away from the blades when the cutters are shifted in an opposite direction, and means on the frame for effecting step-by-step advancement of the blades past the cutters, the saw blade support means being slidably supported on the frame, for movement in a plane normal to the path of reciprocating movement of the cutters, said saw blade support means comprising a flat bar having recesses in which the saw blades may be removably engaged, the cutter-supporting means comprising a pair of vertically spaced discs for each cutter, the cutter being connected between the discs of the pair, each cutter being connected between corresponding marginal portions of its associated discs, so as to be shifted in an up-and-down direction responsive to conjoint rotation of the discs.

4. A reciprocating, multiple-type apparatus for forming a series of notches in a plurality of saw blades, comprising a frame, means movably mounted therein for supporting a plurality of saw blades to be notched, reciprocating cutters on the frame arranged each adjacent a blade to be notched, so as to form notches in the blades responsive to reciprocation of the cutters, means on the frame supporting the cutters for movement against the blades on shifting of the cutters in one direction and for movement of the cutters away from the blades when the cutters are shifted in an opposite direction, and means on the frame for effecting step-by-step advancement of the blades past the cutters, the saw blade support means being slidably supported on the frame, for movement in a plane normal to the path of reciprocating movement of the cutters, said saw blade support means comprising a flat bar having recesses in which the saw blades may be removably engaged, the cutter-supporting means comprising a pair of vertically spaced discs for each cutter, the cutter being connected between the discs of the pair, each cutter being connected between corresponding marginal portions of its associated discs, so as to be shifted in an up-and-down direction responsive to conjoint rotation of the discs, each cutter having horizontal, transverse slots at its ends, the discs having pins extending through the slots for permitting lateral displacement of the cutters on the pins, the cutters being spring-biased laterally in a direction tending to hold the same in engagement with the blades during the shifting of the cutters in said one direction.

5. A reciprocating, multiple-type apparatus for forming a series of notches in a plurality of saw blades, comprising a frame, means movably mounted therein for supporting a plurality of saw blades to be notched, reciprocating cutters on the frame arranged each adjacent a blade to be notched, so as to form notches in the blades responsive to reciprocation of the cutters, means on the frame supporting the cutters for movement against the blades on shifting of the cutters in one direction and for movement of the cutters away from the blades when the cutters are shifted in an opposite direction, and means on the frame for effecting step-by-step advancement of the blades past the cutters, the saw blade support means being slidably supported on the frame, for movement in a plane normal to the path of reciprocating movement of the cutters, said cutter-advancing means comprising a series of ratchet teeth on the blade support means, a peripheral cam on one of the discs of each pair, and a lever-and-pawl assembly rockably mounted on the frame and adapted at one end to be engaged by said cam and adapted at its other end for engaging said series of ratchet teeth, to advance the blade support means on each rocking of said assembly.

6. A reciprocating, multiple-type apparatus for forming a series of notches in a plurality of saw blades, comprising a frame, means movably mounted therein for supporting a plurality of saw blades to be notched, reciprocating cutters on the frame arranged each adjacent a blade to be notched, so as to form notches in the blades responsive to reciprocation of the cutters, means on the frame supporting the cutters for movement against the blades on shifting of the cutters in one direction and for movement of the cutters away from the blades when the cutters are shifted in an opposite direction, and means on the frame for effecting step-by-step advancement of the blades past the cutters, the saw blade support means being slidably supported on the frame, for movement in a plane normal to the path of reciprocating movement of the cutters, said cutter-advancing means comprising a series of ratchet teeth on the blade support means, a peripheral cam on one of the discs of each pair, and a lever-and-pawl assembly rockably mounted on the frame and adapted at one end to be engaged by said cam and adapted at its other end for engaging said series of ratchet teeth, to advance the blade support means on each rocking of said assembly, said assembly including an angular lever pivoted intermediate its ends of the frame.

7. A reciprocating, multiple-type apparatus for forming a series of notches in a plurality of saw blades, comprising a frame, means movably mounted therein for supporting a plurality of saw blades to be notched, reciprocating cutters on the frame arranged each adjacent a blade to be notched, so as to form notches in the blades responsive to reciprocation of the cutters, means on the frame supporting the cutters for movement against the blades on shifting of the cutters in one direction and for movement of the cutters away from the blades when the cutters are shifted in an opposite direction, and means on the frame for effecting step-by-step advancement of the blades past the cutters, the saw blade support means being slidably supported on the frame, for movement in a plant normal to the path of reciprocating movement of the cutters, said cutter-advancing means comprising a series of ratchet teeth on the blade support means, a peripheral cam on one of the discs of each pair, and a lever-and-pawl assembly rockably mounted on the frame and adapted at one end to be engaged by said cam and adapted at its other end for engaging said series of ratchet teeth, to advance the blade support means on each rocking of said assembly, said assembly including an angular lever pivoted intermediate its ends of the frame, to swing in a plane perpendicular to the plane of rotation of the discs.

8. A reciprocating, multiple-type apparatus for forming a series of notches in a plurality of saw blades, comprising a frame, means movably mounted therein for supporting a plurality of saw blades to be notched, reciprocating cutters on the frame arranged each adjacent a blade to be notched, so as to form notches in the blades responsive to reciprocation of the cutters, means on the frame supporting the cutters for movement against the blades on shifting of the cutters in one direction and for movement of the cutters away from the blades when the cutters are shifted in an opposite direction, and means on the frame for effecting step-by-step advancement of the blades past the cutters, the saw blade support means being slidably supported on the frame, for movement in a plane normal to the path of reciprocating movement of the cutters, said cutter-advancing means comprising a series of ratchet teeth on the blade support means, a peripheral cam on one of the discs of each pair, and a lever-and-pawl assembly rockably mounted on the frame and adapted at one end to be engaged by said cam and adapted at its other end for engaging said series of ratchet teeth, to advance the blade support means on each rocking of said assembly, said assembly including an angular lever pivoted intermediate its ends of the frame, to swing in a plane perpendicular to the plane of rotation of the discs, the lever having at said one end a flat head disposed for engagement by said cam.

9. A reciprocating, multiple-type apparatus for forming a series of notches in a plurality of saw blades, comprising a frame, means movably mounted therein for supporting a plurality of saw blades to be notched, reciprocating cutters on the frame arranged each adjacent a blade to be notched, so as to form notches in the blades responsive to reciprocation of the cutters, means on the frame supporting the cutters for movement against the blades on shifting of the cutters in one direction and for movement of the cutters away from the blades when the cutters are shifted in an opposite direction, and means on the frame for effecting step-by-step advancement of the blades past the cutters, the saw blade support means being slidably supported on the frame, for movement in a plane normal to the path of reciprocating movement of the cutters, said cutter-advancing means comprising a series of ratchet teeth on the blade support means, a peripheral cam on one of the discs of each pair, and a lever-and-pawl assembly rockably mounted on the frame and adapted at one end to be engaged by said cam and adapted at its other end for engaging said series of ratchet teeth, to advance the blade support means on each rocking of said assembly, said assembly including an angular lever pivoted intermediate its ends on the frame, to swing in a plane perpendicular to the plane of rotation of the discs, the lever having at said one end a flat head disposed for engagement by said cam, each cam comprising a single rounded lug on the periphery of its associated disc, for rocking of the lever once on each 360° rotation of the disc.

10. A reciprocating, multiple-type apparatus for forming a series of notches in a plurality of saw blades, comprising a frame, means movably mounted therein for supporting a plurality of saw blades to be notched, reciprocating cutters on the frame arranged each adjacent a blade to be notched, so as to form notches in the blades responsive to reciprocation of the cutters, means on the frame supporting the cutters for movement against the blades on shifting of the cutters in one direction and for movement of the cutters away from the blades when the cutters are shifted in an opposite direction, and means on the frame for effecting step-by-step advancement of the blades past the cutters, the saw blade support means being slidably supported on the frame, for movement in a plane normal to the path of reciprocating movement of the cutters, said cutter-advancing means comprising a series of ratchet teeth on the blade support means, a peripheral cam on one of the discs of each pair, and a lever-and-pawl assembly rockably mounted on the frame and adapted at one end to be engaged by said cam and adapted at its other end for engaging said series of ratchet teeth, to advance the blade support means on each rocking of said assembly, said assembly including an angular lever pivoted intermediate its ends on the frame, to swing in a plane perpendicular to the plane of rotation of the discs, the lever having at said one end a flat head disposed for engagement by said cam, each cam comprising a single rounded lug on the periphery of its associated disc, for rocking of the lever once on each 360° rotation of the disc, said assembly including a leaf spring pawl on the other end of the lever disposed for engaging a ratchet tooth to advance the blade support means on rocking of the lever in one direction, the pawl ratcheting over the ratchet teeth on rocking of the lever in a return direction.

References Cited in the file of this patent
UNITED STATES PATENTS

| | | |
|---|---|---|
| 567,296 | Coursen | Sept. 8, 1896 |
| 997,817 | Hobson | July 11, 1911 |
| 1,323,085 | Moody | Nov. 25, 1919 |
| 1,486,851 | Baldwin | Mar. 18, 1924 |